(12) United States Patent
Leone et al.

(10) Patent No.: US 7,733,238 B2
(45) Date of Patent: Jun. 8, 2010

(54) HANDHELD DATA CAPTURE SYSTEM WITH POWER AND SAFETY MONITOR AND METHOD THEREFORE

(75) Inventors: Steven V. Leone, Lake Worth, FL (US); Larry K. Canipe, Boca Raton, FL (US)

(73) Assignee: Sensormatic Electronics, LLC, Boca Raton, FL (US)

( * ) Notice: Subject to any disclaimer, the term of this patent is extended or adjusted under 35 U.S.C. 154(b) by 277 days.

(21) Appl. No.: 12/028,605

(22) Filed: Feb. 8, 2008

(65) Prior Publication Data

US 2008/0266128 A1 Oct. 30, 2008

Related U.S. Application Data

(60) Provisional application No. 60/926,620, filed on Apr. 27, 2007.

(51) Int. Cl.
*G08B 21/00* (2006.01)

(52) U.S. Cl. .................. 340/669; 340/670; 340/539.1; 340/566; 340/572.1; 340/5.61; 235/454; 235/462.3; 235/472.01

(58) Field of Classification Search .................. 340/669, 340/670, 539.1, 546, 566, 635, 657, 5.61, 340/572.1, 653; 235/454, 462.3, 472.01, 235/492

See application file for complete search history.

(56) References Cited

U.S. PATENT DOCUMENTS

| 7,611,061 | B2* | 11/2009 | Steele et al. | 235/462.3 |
| 2006/0054708 | A1* | 3/2006 | Koo et al. | 235/492 |
| 2006/0255139 | A1* | 11/2006 | Lee et al. | 235/439 |

* cited by examiner

*Primary Examiner*—Hung T. Nguyen
(74) *Attorney, Agent, or Firm*—Christopher & Weisberg, P.A.

(57) ABSTRACT

The present invention provide a motion detection circuit for a handheld item detection system, where the motion detection circuit includes an accelerometer outputting at least one signal corresponding to a measured acceleration. A differentiator differentiates the measured acceleration. A motion detection device evaluates a discriminated version of the acceleration and a discriminated version of the acceleration to determine whether the handheld item detection system is in motion. The present invention extends battery life and allows a handheld system to quickly enter an active operational mode without any user intervention other than handling (moving) the system.

20 Claims, 2 Drawing Sheets

HANDHELD DATA CAPTURE SYSTEM WITH POWER AND SAFETY MONITOR AND METHOD THEREFORE

CROSS-REFERENCE TO RELATED APPLICATION

The present invention is related to and claims priority to U.S. Provisional Patent Application No. 60/926,620, filed Apr. 27, 2007, entitled AUTONOMOUS MOTION SENSOR FOR BATTERY LIFE EXTENSION AND SAFETY MONITORING AND METHOD THEREFORE, the entire contents of which is incorporated herein by reference.

STATEMENT REGARDING FEDERALLY SPONSORED RESEARCH OR DEVELOPMENT

Not Applicable

FIELD OF THE INVENTION

The present invention relates to electronic article surveillance ("EAS") and radio frequency identification ("RFID") and universal product code ("UPC"), i.e., barcode data capture systems, and in particular, to a handheld EAS/RFID data capture system and method that include safety and power management features.

BACKGROUND OF THE INVENTION

Handheld EAS and RFID/UPC data capture systems are used to scan items for EAS and RFID tags in a manner that allows the user to scan the item by pointing the handheld system at the item such as may occur at a checkout station in a retail environment or when taking inventory. This is particularly useful when the item to be scanned is large or when there are multiple items on a shelf or storage unit to be scanned. These handheld systems often operate wirelessly and include batteries to allow untethered operation.

Because the handheld EAS/RFID/UPC systems include batteries, battery life is a concern. The use of large and heavy batteries having a large storage capacity presents a problem due to the handheld nature of the system. If the system is too heavy, it becomes uncomfortable to hold and unwieldy to operate. As such, the use of as small a battery as possible is typically the choice of system designers. In order to accommodate the small battery and conserve battery life, some handheld EAS/RFID/UPC systems implement a low power mode. In this mode, as many power consuming components are disabled or placed into "sleep" mode as possible. To bring the unit back to full function, an input must first be activated such as detecting the operation of a scan trigger by the user. However, the turn-on delay coupled with the fact that the user must take a proactive role in cancelling the low power mode makes operation of the handset complicated and wastes time. It is therefore desirable to have a handheld EAS/RFID/UPC system that quickly returns to full power operation without the requirement that a user take a specific action, such as depressing the trigger, entering a command, depressing a button, etc.

In addition, handheld EAS/RFID/UPC data capture systems are prone to physical abuse such as dropping, banging, etc. Such is the case because these systems are typically heavily used by persons who may not feel the need to exercise care and caution when operating the system. For example, a low level checkout clerk may not treat the system as he would his own personal possessions. This can create problem in EAS environments where it is not uncommon for internal EAS data capture system voltages to approach and exceed 100 volts. If the system is dropped, there is currently no way for the user or a subsequent user to be made aware that the structural integrity of the system should be checked to make sure its continued operation does not present a safety issue.

Rather than alerting a user to check the system, current implementations try to protect the structural integrity of the system so that it is not damaged when abused, dropped, etc. Over-designing the mechanical structure to add strength is one approach. However, this solution is costly in terms of weight and therefore ergonomics for a handheld product. Over-designing also unnecessarily adds costs. It is therefore desirable to have a handheld RFID/EAS/RFID system that can alert users that the system has been dropped, banged, etc., and that it should be checked for damage.

SUMMARY OF THE INVENTION

The present invention advantageously provides a motion detection circuit for a handheld item detection system, where the motion detection circuit includes an accelerometer outputting at least one signal corresponding to a measured acceleration, a differentiator differentiating the measured acceleration, and a motion detection device for evaluating a discriminated version of the acceleration and a discriminated version of the differentiated acceleration to determine whether the handheld item detection system is in motion. The accelerometer of the motion detection circuit may further output a plurality of signals corresponding to measured accelerations along a plurality of axes of motion, e.g., x, y and z, and the differentiator can differentiate the plurality of signals corresponding to the measured accelerations along the plurality of axes of motion, e.g., dx, dy and dz. At least one of the accelerometer output signal and the differentiator signal output may be an analog signal, and the motion detection circuit may also include an analog-to-digital conversion circuit providing a digital signal to the motion detection device based on the analog signal from at least one of the accelerometer and differentiator. In particular, the analog-to-digital conversion circuit can provide a first digital output corresponding to a first acceleration force and a second digital output corresponding to a second acceleration force opposite the first acceleration force.

The motion detection circuit of the present invention may also include a low power input, where the low power input selectively controls a signal input to the motion detection device from at least one of the accelerometer and the differentiator. In addition, a processor may be coupled to the low power input, and the processor may also be coupled to the accelerometer such that the processor exits a low power mode upon receipt of a measured acceleration signal from the accelerometer.

The present invention also provides a handheld item detection system including a motion detection circuit. The motion detection circuit of the handheld item detection system can include an accelerometer outputting at least one signal corresponding to a measured acceleration, a differentiator differentiating the measured acceleration, and a motion detection device evaluating a discriminated version of the acceleration and a discriminated version of the differentiated acceleration to determine whether the handheld item detection system is in motion. The handheld item detection system may further include a processor in electrical communication with the accelerometer, where the processor exits a low power mode upon receipt of a signal indicating that the handheld system item detection system is in motion, evaluates the signal corresponding to the measured acceleration, and subsequently determines whether the motion correlates to a predetermined abnormal motion criteria. For example, the predetermined motion criteria may include an analog or digital g force measurement or indicator along one or more axes.

In addition, if the motion correlates to the predetermined abnormal motion criteria, the processor may prohibit item detection and require some user input relating to the integrity of the handheld system prior to re-allowing use for item detection. Furthermore, the processor may cause at least one stored system charge having a corresponding voltage in excess of a predetermined voltage, such as 50 volts or more for example, to be discharged.

The present invention also provides a method for detecting motion of a handheld item detection system, in which the method includes measuring the acceleration, generating at least one signal corresponding to the measured acceleration, generating at least one differentiated signal corresponding to a rate of change of the measured acceleration, evaluating the measured acceleration and the at least one differentiated signal to determine whether the handheld item detection system is in motion. Low power mode is exited if the handheld system item detection system is determined as being in motion. The at least one signal corresponding to acceleration is evaluated to determine whether the motion correlates to predetermined abnormal motion criteria. The method may also include prohibiting item detection based on the determination of whether the motion correlates to predetermined abnormal motion criteria, requiring a user input relating to the integrity of the handheld system prior to re-allowing use for item detection, and/or discharging at least one stored system charge having a corresponding voltage in excess of a predetermined voltage.

BRIEF DESCRIPTION OF THE DRAWINGS

A more complete understanding of the present invention, and the attendant advantages and features thereof, will be more readily understood by reference to the following detailed description when considered in conjunction with the accompanying drawings wherein.

DETAILED DESCRIPTION OF THE INVENTION

Figure 1:
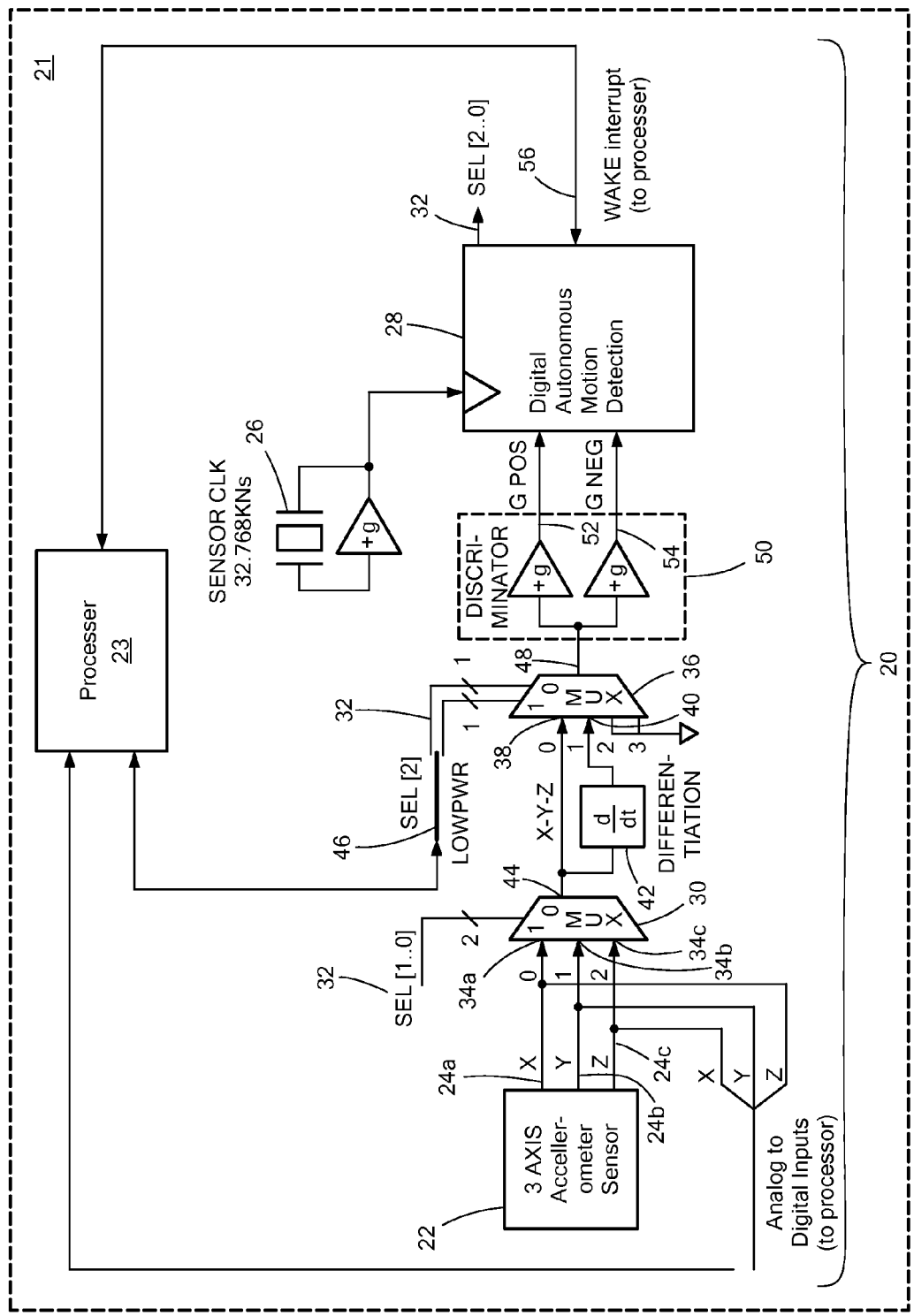
FIG. 1 is a diagram of an embodiment of a motion detection circuit for a handheld EAS/RFID/UPC item detection system constructed in accordance with the principles of the present invention.

Referring now to the drawing figures in which like reference designators refer to like elements, there is shown in FIG. 1 a motion detection circuit for a handheld EAS/RFID/UPC item detection system constructed in accordance with the principles of the present invention, designated generally as "20". The motion detection circuit 20 may be integrated or otherwise included as part of a handheld EAS/RFID/UPC item detection system (generally outlined and designated as "21"). Such item detection systems 21 are commonly referred to as "readers," and such systems can includes those components and software as may be known for detecting and interrogating RFID and/or EAS tags within the interrogation zone of the system. The EAS/RFID/UPC item detection system components may primarily include a processor 23, in addition to a transmitter, receiver, antenna, user operable input device (s), display, audible transducer and the like (not shown). It is also contemplated that the handheld EAS/RFID/UPC item detection system 21 can be used to activate and deactivate EAS tags, such as magneto-acoustic or other tags as may be known. Methods and hardware for activating and deactivating EAS tags are known and are not described herein.

Referring to FIG. 1, the motion detection circuit 20 may include a motion sensor able to detect or otherwise measure a movement along one or more axes. For example, the motion detection circuit 20 may include a 3-axis accelerometer 22 that includes three analog outputs 24a, 24b, and 24c for acceleration along directional axes X, Y, and Z, respectively (referred to collectively herein as outputs 24). The signal output on each of outputs 24a, 24b and 24c may be proportional to the experienced forces or motion on each corresponding axis. For example, the output of the accelerometer 22 may be in volts per gravitational units, or "V/g." Moreover, because g forces can be both negative as well as positive, a measurement of 0 g falls mid-scale. For example, where the signal output of outputs 24 range from 0 to 3.3 Volts DC, 0 g is represented by approximately a 1.65 Volt DC signal. By way of example, the high end of the voltage scale of the output signal of the accelerometer 22 can represent positive g's while the low end may represent negative g's.

The motion detection circuit 20 may further include a sensor clock 26, which provides a clock signal to drive a digital autonomous motion detection device 28 independent of any other system clock which might be permitted to be disabled or shut down. By way of non-limiting example, the clock 26 may operate at relatively low frequency such as 32.768 kHz. This operational frequency can be provided by a commonly available watch crystal, and further, the lower clock speed results in lower power consumption by motion detection device 28 as compared to crystal clocks operating at megahertz frequencies. In addition, the motion detection device 28 may adequately perform the functions described herein at the lower kilohertz clock speed levels without the need for higher operating frequencies. The sensor clock 26 may run continuously, even when the EAS/RFID/UPC item detection system 21 is operating in a low power mode and/or a main system clock is shut down to conserve power. The motion detection device 28 and its corresponding functionality can be implemented, for example, using a complex programmable logic device ("CPLD"). It is contemplated that a CPLD can be used to reduce circuit board space and power consumption.

The motion detection circuit 20 may also include a sensor axis signal multiplexer 30. In operation, the motion detection device 28 has a three bit repeating counter output providing three bit signal line 32 which, among functions described herein, uses the two least significant bits to select one of the X, Y, and Z inputs 34a, 34b and 34c, respectively, on sensor axis signal multiplexer 30 via SEL[1 . . . 0]. That portion of the count repeats as 0, 1, 2, 0, 1, 2, etc. to select X, Y, Z continuously. Inputs 34a, 34b and 34c are electrically coupled to outputs 24a, 24b and 24c, respectively, on accelerometer 22.

The output of the multiplexer 30 is fed into a detection multiplexer 36 which switches between two inputs, namely an X, Y, Z input 38 from sensor axis signal multiplexer 30 or a differentiator input 40 from a differentiator 42. The differentiator 42 is electrically coupled to the output of the sensor axis signal multiplexer 30 and differentiates the X, Y and Z axis signals to derive the rate of change versus time of the axis signals, i.e., dx/dt, dy/dt and dz/dt. In short, the differentiator 42 detects the rate of changes in acceleration. It is noted that the present invention can be implemented using parallel signal lines input to multiple discriminators or motion detection device 28, thereby eliminating the use of multiplexers such as multiplexers 30 and 36.

The X, Y, and Z input 38 is used to determine whether the handheld system is in free fall. For example, where the X, Y, and Z signal outputs form the accelerometer 22 are each equal to approximately 0 g, it can be inferred that the handheld system is in free fall. As discussed further below, the handheld system processor 23 may be re-awakened and taken out of low power mode when movement is sensed or a signal is output from the accelerometer 22, and subsequently the EAS/RFID/UPC item detection system 21 can measure the analog inputs to determine the magnitude of the drop shock forces, if any, and whether further action should be taken or recommended to the user.

Figures 2, 3:
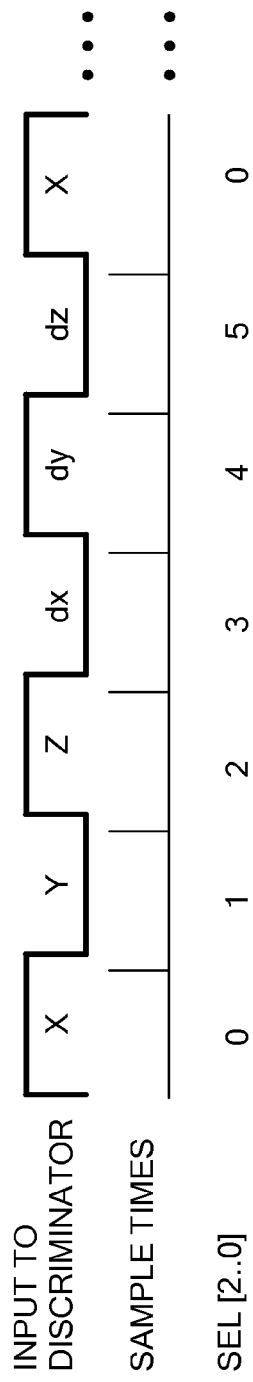
FIG. 2 is a diagram of an exemplary waveform and timing sequence for the circuit of FIG. 1.
FIG. 3 is a diagram of an exemplary state table for the discriminators of FIG. 1.

As mentioned above, the EAS/RFID/UPC item detection system 21 may have a hibernation or low power mode when idle. When the system is in low power mode, the processor 23 within the system 21 may hold a lower power (LOWPWR) input 46 on the detection multiplexer 36 low, thereby setting detection multiplexer 36 to output one of inputs 38 or 40 on a detection multiplexer output 48, depending on the state of SEL[2] on signal line 32. In other words, the output 48 of detection multiplexer 36 is valid only in low power mode, as selected by the LOWPWR input 46. When LOWPWR input 46 is set low, i.e., enabled, then SEL[2], which is the most significant bit in three bit signal line 32, causes output 48 to switch between X, Y and Z input 38 and derivative input 40 (dx/dt, dy/dt, dz/dt). An exemplary time order of the signals to an analog to digital discriminator 50 is as shown in FIG. 2. Counting up through the three bit signal line 32 causes the sensor axis signal multiplexer 30 and, as a result, the detection multiplexer 36, to provide the following six step sequence— X, Y, Z, dx/dt, dy/dt, dz/dt, etc. at output 48.

Continuing to refer to FIG. 1, output 48 of the motion detection circuit 20 is provided to discriminator 50. Discriminator 50 is an analog to digital conversion circuit whose outputs, namely positive output 52 and negative output 54, reflect the state of the g force input as measured by the accelerometer 22 and processed through the additional circuit components at a particular time. Now referring to FIG. 3, it is shown that a 0 g input to the discriminator 50 results in the outputs 52 and 54 equaling 0, 0, respectively. At negative g force input, the outputs 52 and 54 are 0, 1, respectively. At positive g force input, the outputs are 1, 0, respectively. The outputs 52 and 54 are electrically coupled to the motion detection device 28. The digital autonomous motion detection device 28 evaluates the two digital inputs from discriminator 50 and matches them with the channel selected (X, Y, Z, dx/dt, dy/dt, dz/dt) to determine if the system is falling (X, Y and Z each equal approximately 0 g for consecutive samples) or if the system is in motion (|dx/dt or dy/dt or dz/dt|>0 g one time).

Once a determination of whether the system is in either free fall or motion, a WAKE interrupt signal 56 is generated by motion detection device 28 and sent to the processor 23 to wake it or otherwise transition from low power mode. The processor 23 can subsequently read the analog outputs 24a, 24b and 24c of accelerometer 22 to determine if the motion is a simple motion associated with normal use or whether the motion is abnormal motion, indicating for example that the handheld system has been dropped.

It is contemplated that the approximate time of each sequence step window is 1 ms with the sample latch timed to occur 100 us before the end of that window to allow for switching transients to settle out. One millisecond is fast enough to wake the processor 23 during a fall before the handheld system 21 hits the ground (when dropped from an average countertop height) and allows the processor to measure the magnitude of the g forces on impact using the analog to digital signal lines 24a, 24b and 24c.

For simple motion, the processor of the EAS/RFID/UPC item detection system 21 can be programmed to prepare circuits and communication channels for activity such as charging a deactivation capacitor, re-establishing wireless communications, etc. If the wake signal 56 was the result of abnormal motion such as a drop, then the processor 23 can be pre-programmed to query the user for information of the integrity of the handheld system, optionally requiring the user to enter information to continue and/or disabling the handheld system 21 until an authorized repair facility can inspect and repair the system. Furthermore, if a drop is detected, an EAS system can optionally discharge high voltage storage system energy, i.e., energy having a voltage component exceeding approximately 50 volts, such as is stored in a deactivation capacitor, thereby making the electrical components safe if exposed.

If an integrity query is satisfied and/or if components are discharged, the handheld system 21 may be programmed to re-enter low power sleep mode after a pre-programmed time of no activity and static motion, and autonomous motion detection circuit 20 can be re-enabled.

An advantage of the present invention is the ability to extend battery life and allow the handheld system to quickly enter an active operational mode without any user intervention other than handling (moving) the system. Using an autonomous motion detection circuit 20 that operates independently of the processor advantageously allows the processor and all other system functions to enter into a low power state. Circuit 20 is an ultra low power circuit and therefore does not significantly affect battery life on its own even when the system is in low power mode and circuit 20 is active.

A further advantage is that the present invention facilitates faster regulatory approval for systems using the hazardous voltages required for EAS devices and attenuates potential product liability by requiring the user to respond to one or more queries or questions after a drop/bang is detected before allowing the system to be further operated.

It will be appreciated by persons skilled in the art that the present invention is not limited to what has been particularly shown and described herein above. In addition, unless mention was made above to the contrary, it should be noted that all of the accompanying drawings are not to scale. A variety of modifications and variations are possible in light of the above teachings without departing from the scope and spirit of the invention, which is limited only by the following claims.

What is claimed is:

1. A motion detection circuit for a handheld item detection system, the motion detection circuit comprising:
    an accelerometer, the accelerometer outputting at least one signal corresponding to a measured acceleration;
    a differentiator, the differentiator differentiating the at least one signal corresponding to the measured acceleration; and
    a motion detection device, the motion detection device evaluating a discriminated version of the acceleration and a discriminated version of the differentiated acceleration to determine whether the handheld item detection system is in motion.

2. The motion detection circuit of claim 1, wherein the accelerometer outputs a plurality of signals corresponding to measured accelerations along a plurality of axes of motion.

3. The motion detection circuit of claim 2, wherein the differentiator differentiates the plurality of signals corresponding to the measured accelerations along the plurality of axes of motion.

4. The motion detection circuit of claim 1, wherein at least one of the accelerometer output signal and the differentiator output is analog.

5. The motion detection circuit of claim 4, further comprising an analog-to-digital conversion circuit providing a digital signal to the motion detection device based on the analog signal from at least one of the accelerometer and differentiator.

6. The motion detection circuit of claim 5, wherein the analog-to-digital conversion circuit provides a first digital output corresponding to a first acceleration force and a second digital output corresponding to a second acceleration force opposite the first acceleration force.

7. The motion detection circuit of claim 1, further comprising a low power input, wherein the low power input selectively controls a signal input to the motion detection device from at least one of the accelerometer and the differentiator.

8. The motion detection circuit of claim 7, further comprising a processor coupled to the low power input.

9. The motion detection circuit of claim 8, wherein the processor exits a low power mode upon receipt of a measured acceleration signal from the accelerometer.

10. A handheld item detection system, comprising:
a motion detection circuit, the motion detection circuit including:
an accelerometer, the accelerometer outputting at least one signal corresponding to a measured acceleration;
a differentiator, the differentiator differentiating the acceleration; and
a motion detection device, the motion detection device evaluating a discriminated version of the acceleration and a discriminated version of the differentiated acceleration to determine whether the handheld item detection system is in motion.

11. The handheld item detection system of claim 10, further comprising a processor in electrical communication with the accelerometer, the processor exits a low power mode upon receipt of a signal indicating that the handheld system item detection system is in motion.

12. The handheld item detection system of claim 11, wherein the process further:
evaluates the signal corresponding to the measured acceleration; and
determines whether the motion correlates to a predetermined abnormal motion criteria.

13. The handheld item detection system of claim 11, wherein if the motion correlates to the predetermined abnormal motion criteria, the processor:
prohibits item detection; and
requires user input relating to the integrity of the handheld system prior to re-allowing use for item detection.

14. The handheld item detection system of claim 11, wherein if the motion correlates to the predetermined abnormal motion criteria, the processor causes at least one stored system charge having a corresponding voltage in excess of a predetermined voltage to be discharged.

15. The handheld item detection system of claim 14, wherein the predetermined voltage is greater than approximately 50 volts.

16. A method for detecting motion of a handheld item detection system, the method comprising:
measuring acceleration;
generating at least one signal corresponding to the measured acceleration;
generating at least one differentiated signal corresponding to a rate of change of the measured acceleration;
evaluating the measured acceleration and at least one differentiated signal to determine whether the handheld item detection system is in motion;
exiting a low power mode if the handheld system item detection system is determined as being in motion;
evaluating the at least one signal corresponding to acceleration; and
using a processor for determining whether the motion correlates to predetermined abnormal motion criteria.

17. The method of claim 16, wherein the predetermined motion criteria includes a g force measurement along one or more axes.

18. The method of claim 16, further comprising the step of prohibiting item detection based on the determination of whether the motion correlates to predetermined abnormal motion criteria.

19. The method of claim 18, further comprising the step of requiring a user input relating to the integrity of the handheld system prior to re-allowing use for item detection.

20. The method of claim 16, further comprising the step of discharging at least one stored system charge having a corresponding voltage in excess of a predetermined voltage.

* * * * *